UNITED STATES PATENT OFFICE.

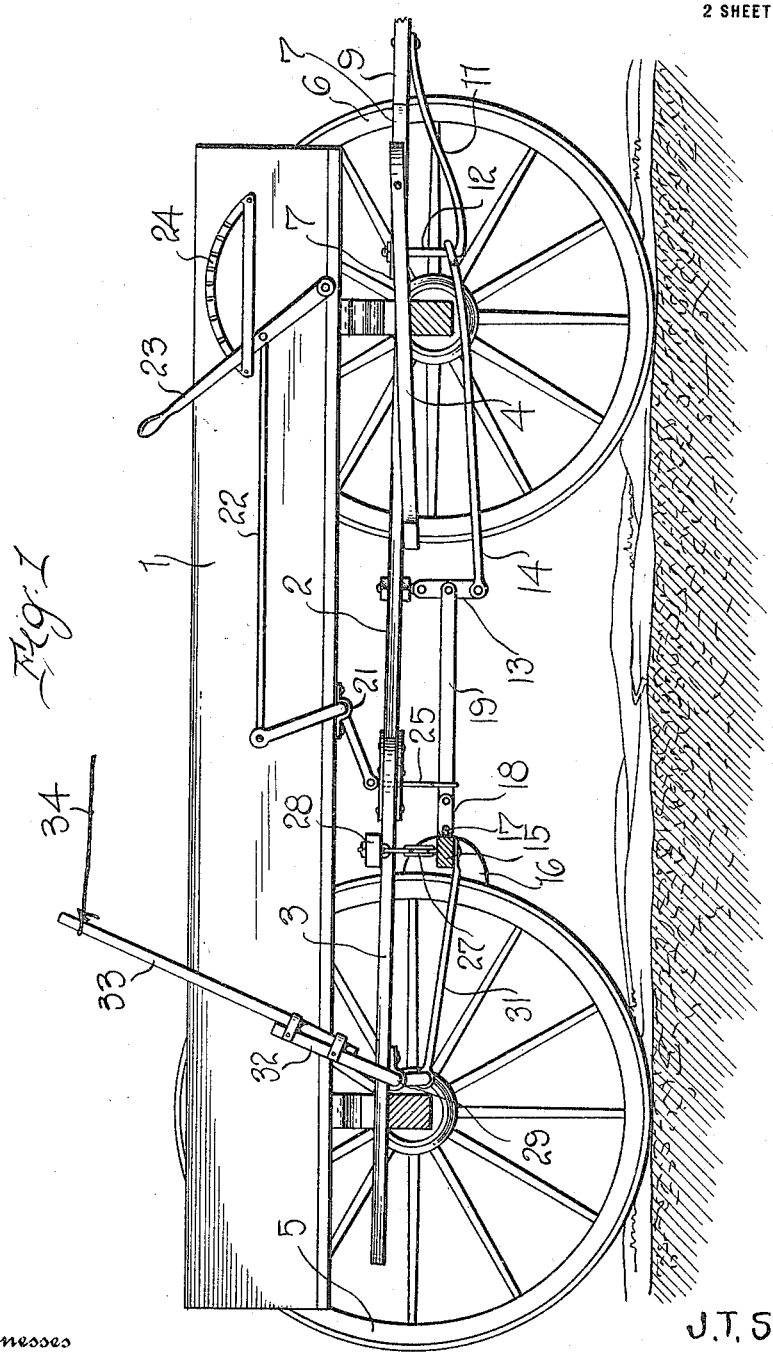

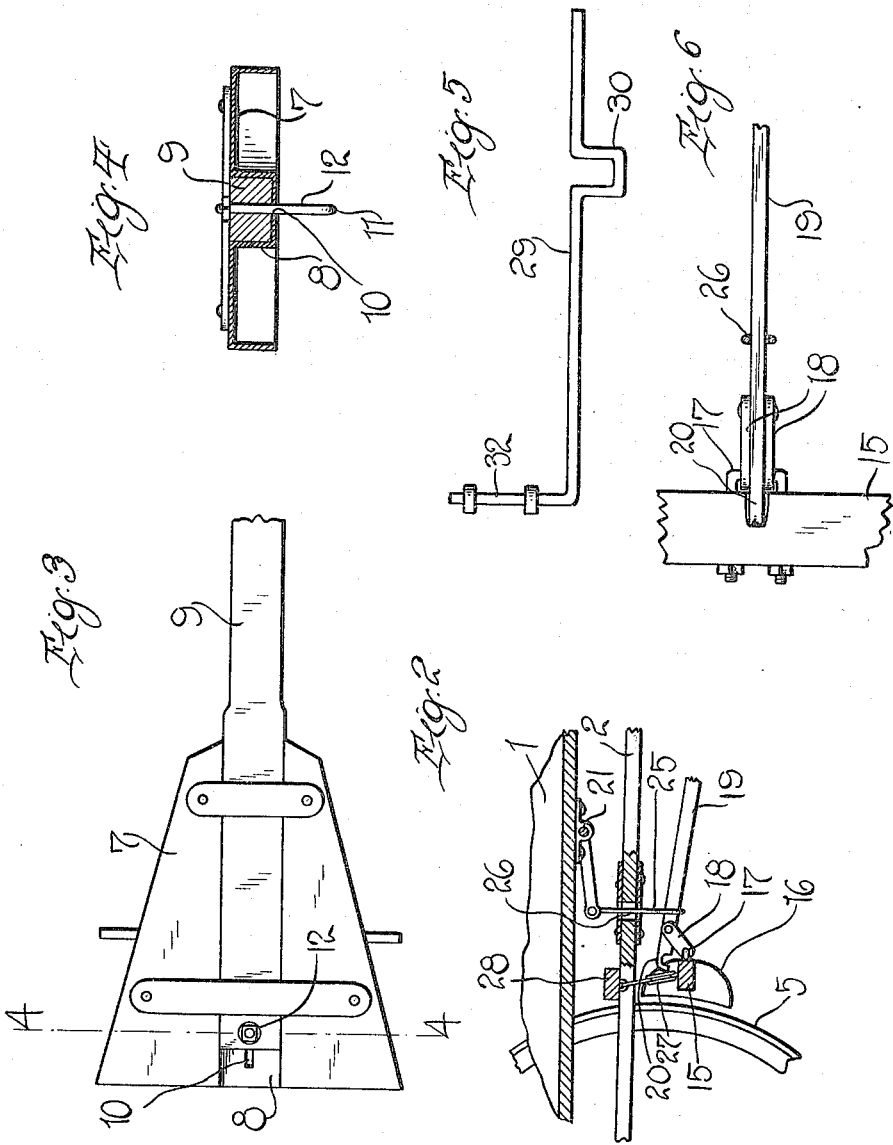

JOHN T. STEPHENS, OF KNOXVILLE, IOWA, ASSIGNOR OF ONE-THIRD TO WILLARD H. LYON, OF KNOXVILLE, IOWA.

AUTOMATIC VEHICLE-BRAKE.

1,137,095.

Specification of Letters Patent.     Patented Apr. 27, 1915.

Application filed August 8, 1914. Serial No. 855,850.

*To all whom it may concern:*

Be it known that I, JOHN T. STEPHENS, a citizen of the United States, residing at Knoxville, in the county of Marion and State of Iowa, have invented certain new and useful Improvements in Automatic Vehicle-Brakes, of which the following is a specification, reference being had to the accompanying drawings.

This invention relates to new and useful improvements in brakes, and particularly to vehicle brakes which are automatic in operation.

An object of this invention is the provision of an automatic brake which comprises a brake beam swingingly mounted upon the running gear of a vehicle, the running gear including a tongue slidably connected to the front hounds, means being provided for operatively connecting the brake beam with the tongue so that upon back-draft of the animals connected to the tongue, the brake beam will be moved to engage the brake shoes against the wheels.

A further object of this invention is the provision of an automatic brake which comprises a swingingly brake beam operatively connected to a sliding tongue, whereby upon back-draft of the tongue the brake beam will be moved rearwardly to apply the shoes against the rear wheels, means being provided to move the brake beam out of operative position, so that back-draft may be applied on the tongue without engaging the brake shoes against the wheels.

A still further object of this invention is the provision of an automatic brake which comprises a swingingly brake beam operatively connected to the sliding tongue, the brake beam being also operatively connected to a manual movable lever, whereby the brake shoes may be forced against the rear wheels while forward-draft is being applied to the tongue.

With these and other objects in view, my invention consists in the novel construction, combination, and arrangement of parts, to be hereinafter more fully described, claimed, and illustrated in the accompanying drawings, in which—

Figure 1 is a side elevational view of my device partly in section; Fig. 2 is a fragmentary side elevation partly in section showing the manner of supporting the brake beam; Fig. 3 is a top plan view showing the tongue slidably mounted in the plate which is supported in the front hounds; Fig. 4 is a sectional view on the line 4—4 of Fig. 3; Fig. 5 is a elevational view of the crank shaft connected to the manually operating lever; and Fig. 6 is a fragmentary top plan view of the brake beam showing the manner of connecting the same to the operating bar below the reach.

Referring more particularly to the drawings, the numeral 1 designates the body of a wagon or similar vehicle, to the under face of which the reach 2 is connected, and connected to the reach are the stationary rear hounds 3 and the pivoted front hounds 4.

The vehicle is provided with the usual rear wheels 5, and the forward steering wheels 6, and pivotally mounted between the forward ends of the front hounds 4 is a plate 7, which is provided with a central longitudinally extending downwardly offset portion 8 to provide a seat for the slidable tongue 9. The offset portion 8 is provided with a longitudinal slot 10 therein, and secured at its forward end to the tongue forwardly of the plate 8 is a rod 11, the rear end of which is spaced below the plate and is provided with an upstanding end 12 which projects through the slot 10 and is secured in the rear end to the tongue, whereby the sliding movement of the tongue is limited. Pivotally connected at one end to the reach rearwardly of the front hounds is a connecting link 13, and pivotally connected to the free end of the link is a rod 14 which is connected at its forward end to the upstanding end 12 of the rod 11.

Disposed below the reach 2 is a brake beam 15 upon which the shoes 16 are mounted for engagement against the periphery of the rear wheels 5. Extending forwardly of the brake beam intermediate of its ends is the curved portion of a U-shaped connecting member 17, upon which are mounted the apertured ends of a pair of links 18, the other ends of the links being pivotally connected to the side faces of the longitudinally extending connecting rod 19 adjacent its rear end, the forward end of which is pivotally connected to the link 13 intermediate of its ends. The rear end of the rod 19 is hook-shaped as at 20, the hook being adapted to engage the intermediate portion of the member 17 between the links 18.

Rotatably mounted in bearings secured to the bottom of the body of the wagon is a crank shaft 21 one end of the crank shaft extending upwardly along one side of the body, and being connected at its free end to a connecting rod 22 which is connected at its forward end to an operating lever 23, the lever being adapted for engagement with a rack 24. The other end of the crank shaft 21 extends downwardly above the reach 2, and connected at its upper end to the downturned end of the crank shaft is a rod 25, the rod extending through a slot 26 in the reach and being engaged at its lower end around the rod 19, whereby upon forward movement of the lever 23, the rod 19 will be raised to swing the brake beam upwardly and forwardly out of operative position.

The brake beam is supported at its opposite ends in operative position, by links 27 which are connected to the ends of a transversely extending bar 28 secured intermediate of its ends to the reach rearwardly of the slot 26 therein. Rotatably supported in bearings secured to the rear hounds 3 is a crank shaft 29, the crank 30 of the shaft having the rear end of a connecting rod 31 pivotally connected thereto, the forward end of the connecting rod 31 being secured to the brake beam 15. The crank shaft 29 is provided at one end with an upstanding extension 32 to which a handle 33 may be connected, a cable 34 being adapted for connection at its rear end to the handle 33, the cable extending forwardly to a point within reach of the driver of the wagon, so that upon a pull on the cable, the brake may be operated manually by reason of the connection of the crank shaft with the brake beam through the medium of the connecting rod 31.

In the practical use of my improved device, the draft animals are connected to the tongue in the usual manner, and when a forward pull is exerted upon the tongue, the brake beam 15 is held forwardly of the wheels so that the brake shoes 16 are spaced from the peripheries of the wheels, whereby the brake is maintained inoperative. When backward pressure is applied upon the tongue, the brake beam is moved rearwardly by reason of its connection with the tongue, to force the brake shoes against the wheels and thus automatically reduce the speed of the wagon. To hold the brake beam out of its operative position when it is desired to back the wagon, the lever 23 is moved forwardly, whereby the rod 19 is raised, to move the hooked end 20 of the rod 19 out of its engagement with the connecting member 17, so that upon back pressure upon the tongue, the rear end of the rod 19 will move backwardly above the brake beam, so that the brake shoes will not be forced against the wheels. When it is desired to apply the brakes independently of the movement of the tongue, a forward pull upon the cable 34 will rock the crank shaft 29 to move the connecting rod 31 rearwardly which draws the brake beam 15 in the same direction, to force the brake shoes against the wheels.

From the above description taken in connection with the accompanying drawings, it will be seen that I have provided a brake which may be either automatically or manually operated, and which may be readily thrown out of operative position when it is desired to back the wagon, so that rearward movement of the tongue will not force the brake shoes against the wheels.

A brake constructed in accordance with my invention comprises a minimum number of parts, whereby the same may be cheaply manufactured, the brake being of such construction, that the same may be readily applied to wagons at present in use, and may form a part of newly constructed vehicles.

Having thus fully described my invention, what I desire to claim and secure by Letters Patent is:—

1. In combination with the running gear of a vehicle including a reach, hounds, a tongue mounted between the front hounds, and a rod connected with the tongue and provided with an upstanding end, said upstanding end being secured to the rear end of the tongue and movable therewith to limit the sliding movement of the tongue, of a brake beam disposed beneath the reach, and swingingly supported thereby, a depending link pivotally connected at its upper end to the reach, forward of the brake beam, a rod connected at its forward end to the upstanding portion of the rod on the tongue and pivotally connected at its rear end to the lower end of said link, means forming connection between the link and the brake beam to actuate the brake beam upon the rearward movement of the tongue, and manually operated means adapted to actuate said connecting means and disengage the same from the brake beam whereby to move the brake beam forwardly of the reach.

2. In combination with the running gear of a vehicle, including a reach, hounds, and a tongue slidably connected to the front hounds, of a brake beam disposed below the reach and swingingly supported thereby, a depending link pivotally connected at its upper end to the reach forwardly of the brake beam, a rod connected at its forward end to the tongue and pivotally connected at its rear end to the lower end of said link, a U-shaped member carried by the beam and extending forwardly therefrom, links pivotally connected to the U-shaped member, a bar pivotally connected at its forward end to the link intermediate of its ends, said bar being pivotally connected adjacent its rear end between said links, the rear end of said bar being formed with a hook for engagement with said U-shaped member, and means for raising said bar to disengage the hook from the U-shaped member, whereby to move the brake beam forwardly of the reach.

In testimony whereof I hereunto affix my signature in the presence of two witnesses.

JOHN T. STEPHENS.

Witnesses:
CLINNA WELSHER,
W. H. LYON.

Copies of this patent may be obtained for five cents each, by addressing the "Commissioner of Patents, Washington, D. C."